US012122640B2

(12) United States Patent
Gong et al.

(10) Patent No.: US 12,122,640 B2
(45) Date of Patent: Oct. 22, 2024

(54) HEATING CONTROL DEVICE AND METHOD FOR ESCALATOR SYSTEM OR MOVING SIDEWALK SYSTEM

(71) Applicant: Otis Elevator Company, Farmington, CT (US)

(72) Inventors: Xinwei Gong, Haining (CN); Lifei Cheng, Hangzhou (CN); Kaisheng Xu, Haining (CN); Zhaoxia Hu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 144 days.

(21) Appl. No.: 18/070,861

(22) Filed: Nov. 29, 2022

(65) Prior Publication Data

US 2024/0010468 A1 Jan. 11, 2024

(30) Foreign Application Priority Data

Jul. 11, 2022 (CN) ........................ 202210808760.X

(51) Int. Cl.
*B66B 21/02* (2006.01)
*B66B 25/00* (2006.01)
*B66B 31/00* (2006.01)

(52) U.S. Cl.
CPC .............. *B66B 25/00* (2013.01); *B66B 21/02* (2013.01)

(58) Field of Classification Search
CPC .......... B66B 21/02; B66B 25/00; B66B 31/00
(Continued)

(56) References Cited

U.S. PATENT DOCUMENTS 6,382,389 B1 * 5/2002 Mehlert .................. B66B 23/24 198/494
6,994,204 B2 * 2/2006 Buescher ................ B66B 31/00 198/494
(Continued)

FOREIGN PATENT DOCUMENTS

CN 103601063 A 2/2014
CN 103848327 A 6/2014
(Continued)

OTHER PUBLICATIONS

European Search Report for Application No. 22211445.6, Issued Jul. 5, 2023, 8 Pages.

*Primary Examiner* — Douglas A Hess
(74) *Attorney, Agent, or Firm* — CANTOR COLBURN LLP

(57) ABSTRACT

A heating control apparatus and method for an escalator system or automatic walkway system, an escalator system and automatic walkway system including the heating control apparatus, and a computer-readable storage medium on which a computer program for implementing the method is stored. A heating control apparatus for an escalator system or automatic walkway system includes: memory; a processor coupled with the memory; and a computer program stored on the memory and running on the processor, the running of the computer program causes: A. obtaining ambient status and device status of the escalator system or automatic walkway system, the ambient status includes ambient temperature and ambient humidity; and B. generating a control command regarding a heater of the escalator system or automatic walkway system based on the ambient status and the device status.

18 Claims, 3 Drawing Sheets

(58) Field of Classification Search
USPC .......................................................... 198/321
See application file for complete search history.

(56) References Cited

U.S. PATENT DOCUMENTS

| | | | | |
|---|---|---|---|---|
| 7,201,269 | B2 * | 4/2007 | Buscher | B66B 31/00 198/337 |
| 8,103,183 | B2 | 1/2012 | Nemoto et al. | |
| 8,967,364 | B2 * | 3/2015 | Kleine-Bruggeney | B66B 31/02 198/337 |
| 10,035,685 | B2 | 7/2018 | Yamada et al. | |
| 10,173,864 | B2 * | 1/2019 | Hu | B66B 23/20 |
| 11,059,702 | B2 * | 7/2021 | Pahlke | B66B 27/00 |
| 11,225,399 | B2 | 1/2022 | Ye et al. | |
| 2018/0029836 | A1 | 2/2018 | Chen et al. | |
| 2021/0147189 | A1 | 5/2021 | Pahlke et al. | |

FOREIGN PATENT DOCUMENTS

| | | | |
|---|---|---|---|
| CN | 203794427 | U | 8/2014 |
| CN | 206486168 | U | 9/2017 |
| CN | 108358029 | A | 8/2018 |
| CN | 210162998 | U | 3/2020 |
| CN | 112483318 | A | 3/2021 |
| CN | 113697651 | A | 11/2021 |
| CN | 113955617 | A | 1/2022 |
| JP | 2010024023 | A | 3/2021 |
| WO | 2013026476 | A1 | 3/2021 |

* cited by examiner

HEATING CONTROL DEVICE AND METHOD FOR ESCALATOR SYSTEM OR MOVING SIDEWALK SYSTEM

FOREIGN PRIORITY

This application claims priority to Chinese Patent Application No. 202210808760.X, filed Jul. 11, 2022, and all the benefits accruing therefrom under 35 U.S.C. § 119, the contents of which in its entirety are herein incorporated by reference.

TECHNICAL FIELD

The present application relates to elevator technology, in particular to a heating control apparatus and method for an escalator system or automatic walkway system, an escalator system and automatic walkway system comprising the heating control apparatus, and a computer-readable storage medium on which a computer program for implementing the method is stored.

BACKGROUND

Escalators and automatic walkways are transportation device driven by a driving host through a chain to make a circular movement along a fixed track. With the rapid development of modern society and economy, the escalators and automatic walkways have been widely used in shopping malls, airports, railway stations, subway stations and other crowded places.

In low temperature seasons, heaters are usually used to heat the escalators and automatic walkways in order to prevent parts from freezing. For the bulky escalators and automatic walkways, the heating process needs to consume a large amount of electricity. Thus, how to improve the heating efficiency is an important topic.

SUMMARY

According to an aspect of the present application, there is provided a heating control apparatus for an escalator system or automatic walkway system, comprising: memory; a processor coupled with the memory; and a computer program stored on the memory and running on the processor, the running of the computer program causes: A. obtaining ambient status and device status of the escalator system or automatic walkway system, wherein the ambient status includes ambient temperature and ambient humidity; and B. generating a control command regarding a heater of the escalator system or automatic walkway system based on the ambient status and the device status.

Optionally, in the above heating control apparatus, the heating control apparatus is a controller of the escalator system or automatic walkway system.

Optionally, in the above heating control apparatus, the device status comprises current operating status and expected operating status of the escalator system or automatic walkway system.

Optionally, in the above heating control apparatus, the heater operates at constant power, operation B is implemented in accordance with the following: determining a heating duration of the heater based on the ambient status if the current operating status of the escalator system or automatic walkway system is in a state where a step of the escalator system or movable road surface of the automatic walkway system is stationary; determining whether to generate a control command to start the heater based on the determined heating duration and the expected operating status.

Optionally, in the above heating control apparatus, the heating duration is determined in the following manner setting the heating duration to 0 if the ambient temperature is greater than a first threshold or the ambient humidity is less than a second threshold; setting the heating duration to a value that increases as the ambient temperature decreases and increases as the ambient humidity increases if the ambient temperature is between the first threshold and a third threshold and the ambient humidity is between the second threshold and a fourth threshold, wherein the third threshold is less than the first threshold and the fourth threshold is greater than the second threshold; setting the heating duration to an upper value if the ambient temperature is less than the third threshold or the ambient humidity is greater than the fourth threshold.

Optionally, in the above heating control apparatus, for the case where the ambient temperature is between the first threshold and the third threshold and the ambient humidity is between the second threshold and the fourth threshold, the heating duration increases linearly with decreasing ambient temperature and increases linearly with increasing ambient humidity.

Optionally, in the above heating control apparatus, for the case where the ambient temperature is between the first threshold and the third threshold and the ambient humidity is between the second threshold and the fourth threshold, the heating duration increases non-linearly with decreasing ambient temperature and increases non-linearly with increasing ambient humidity.

Optionally, in the above heating control apparatus, the expected operating status is startup status of the escalator system or the automatic walkway system, it determines whether to generate the control command to start the heater in the following manner generating the control command to start the heater if an interval between a current moment and a moment of entering the startup status is less than the heating duration.

According to another aspect of the present application, there is provided an escalator system or an automatic walkway system, comprising: a conveying mechanism; a driving unit for driving the conveying mechanism; a heater; and a heating control apparatus having one or more of the features as described above.

Optionally, in the above escalator system or automatic walkway system, the heater is a resistive wire provided near one or more components of the escalator system or automated walkway system.

According to a further aspect of the present application, there is provided a heating control method for an escalator system or automatic walkway system, comprising: A. obtaining ambient status and device status of the escalator system or automatic walkway system, wherein the ambient status includes ambient temperature and ambient humidity; and B. generating a control command for a heater of the escalator system or automatic walkway system based on the ambient status and the device status.

According to a further aspect of the present application, there is provided a computer-readable storage medium on which a computer program suitable for running on a processor of a terminal device is stored, the running of the computer program causes steps of the method as described above to be performed.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

In the specification of the application, the term "escalator system" refers to a continuous conveying apparatus for transporting passengers and goods between different heights in an upward or downward inclined direction, which usually includes a step with a circular motion as a conveying mechanism.

In the specification of the application, the term "automatic walkway system" refers to a continuous conveying apparatus for transporting passengers and goods in a horizontal direction or in a direction with a small inclination angle, which usually includes a movable road surface with a circular motion as a conveying mechanism.

Figure 1:
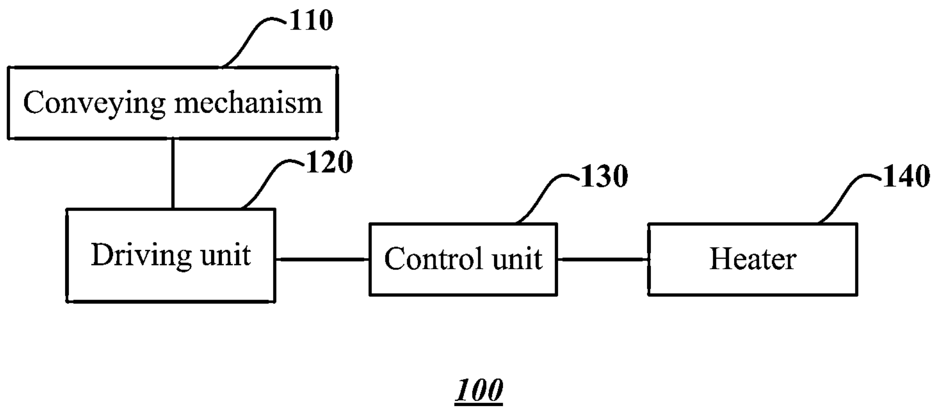
FIG. 1 is a schematic block diagram of a typical escalator system or automatic walkway system.

FIG. 1 is a schematic block diagram of a typical escalator system or automatic walkway system. An escalator system or automatic walkway system shown in FIG. 1 includes a conveying mechanism 110 (e.g., a step with a circular motion or a movable road surface with a circular motion), a driving unit 120 (e.g., a motor) for driving the conveying mechanism 110, a control unit or controller 130, and a heater 140 for heating the components of the escalator system or the automatic walkway system (e.g., the conveying mechanism).

The driving unit 120 moves the conveying mechanism 110 in accordance with control commands from the control unit or controller 130. Exemplarily, the heater 140 may be a resistive wire provided near a component to be heated of the escalator system or the automatic walkway system.

In the embodiment shown in FIG. 1, the control function for the heater 140 is integrated within the control unit 130. That is, the control unit 130 is responsible for controlling the operations of both the driving unit 120 and the heater 140. In an alternative form of the embodiment shown in FIG. 1, the control function for the heater 140 is implemented by a heating control apparatus independent of the control unit.

Figure 2:
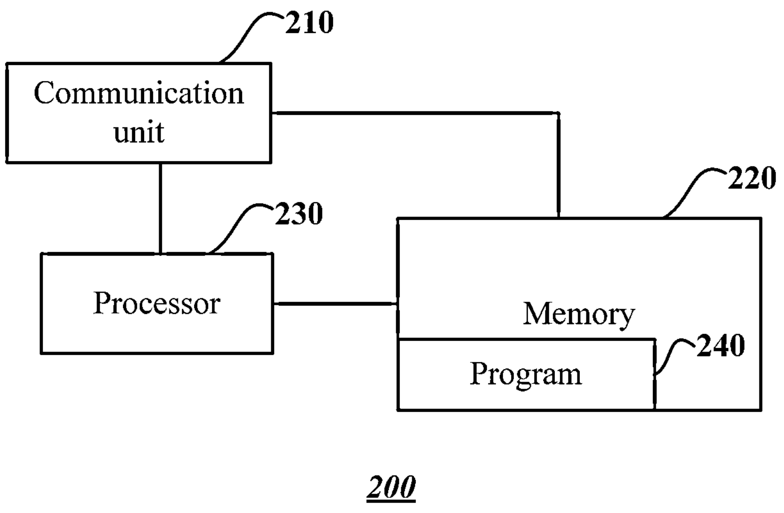
FIG. 2 is a schematic block diagram of a typical controller.

FIG. 2 is a schematic block diagram of a typical controller. A controller shown in FIG. 2 may be used to implement a control unit or a heating control apparatus independent of the control unit in the escalator system or automatic walkway system shown in FIG. 1.

As shown in FIG. 2, a controller 200 includes a communication unit 210, memory 220 (e.g., non-volatile memory such as flash memory, ROM, hard disk drive, magnetic disk, optical disc), a processor 230, and a computer program 240.

The communication unit 210 serves as a communication interface and is configured to establish a communication connection between the controller and an external device (e.g., driving unit 120, temperature sensor, humidity sensor, etc.) or a network (e.g., the Internet).

The memory 220 stores the computer program 240 that can be executed by the processor 230. In addition, the memory 220 may store data generated by the processor 230 when executing the computer program (e.g., ambient status such as temperature and humidity and heating duration, etc.) and data or commands received externally via the communication unit 210 (e.g., an startup command regarding the escalator system or the automatic walkway system).

The processor 230 is configured to run the computer program 240 stored on the memory 220 and to access data on the memory 220 (e.g. to recall data received from an external device and to store results of calculations such as the heating duration in the memory 220).

Figure 3:
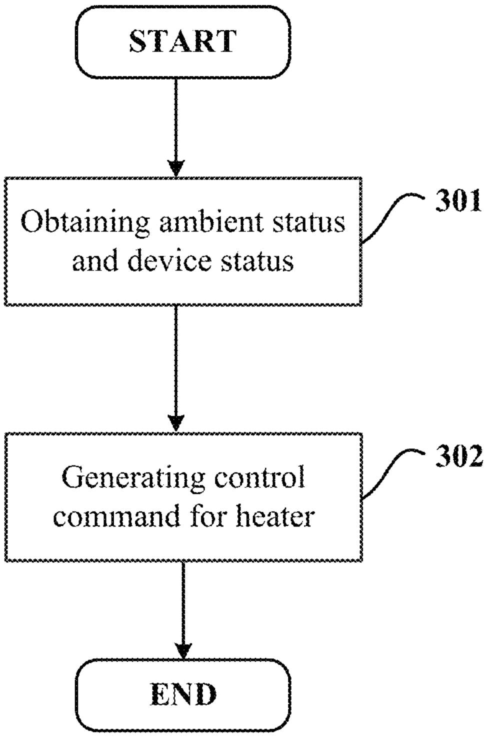
FIG. 3 is a flowchart of a heating control method for an escalator system or automatic walkway system in accordance with some embodiments of the present application.

FIG. 3 is a flowchart of a heating control method for an escalator system or automatic walkway system in accordance with some embodiments of the present application. Exemplarily, the method described below is implemented with the help of the controller shown in FIG. 2. That is, the computer program 240 in FIG. 2 may include computer instructions for implementing the various steps of the method described below, such that the corresponding methods can be implemented when the computer program 240 is run on the processor 230.

Referring to FIG. 3, at step 301, the controller 200 obtains status parameters associated with the heating control. In some embodiments, the status parameters include ambient status surrounding the escalator system or the automatic walkway system and device status of the escalator system or the automatic walkway system.

After research, the inventors of the application have found that the ambient temperature and ambient humidity around the escalator system or the automatic walkway system are important ambient status for heating control. Taking the controller 200 shown in FIG. 2 as an example, it can obtain status parameters such as ambient temperature and ambient humidity from ambient sensors (e.g., temperature sensor and humidity sensor, etc.) via the communication unit 210.

It should be noted that there are no particular restrictions on measuring positions of the ambient temperature and ambient humidity, as long as the available status parameters can be provided for the heating control.

In some embodiments, the device status may include not only current operating status of the escalator system or the automatic walkway system, but may also include expected operating status. Examples of the current operating status include, for example, but are not limited to, the status of the step of the escalator system (moving and stationary) and the status of the movable road surface of the automatic walkway system (moving and stationary). By introducing the expected operating status, the appropriate timing of heating can be determined to reduce energy consumption.

As mentioned above, the control function of the heater may be integrated within the control unit of the escalator system or the automatic walkway system, or it may be implemented by the heating control apparatus independent of the control unit. In the former case, the device status exists as local data; in the latter case, the heating control unit may obtain the device status through communication with an external device.

In step 302, the controller will generate a control command for the heater of the escalator system or the automatic walkway system based on the ambient status and the device status. In some embodiments, examples of a control command include, for example, but are not limited to, heating duration, heating power, and heating start moment, etc.

Figure 4:
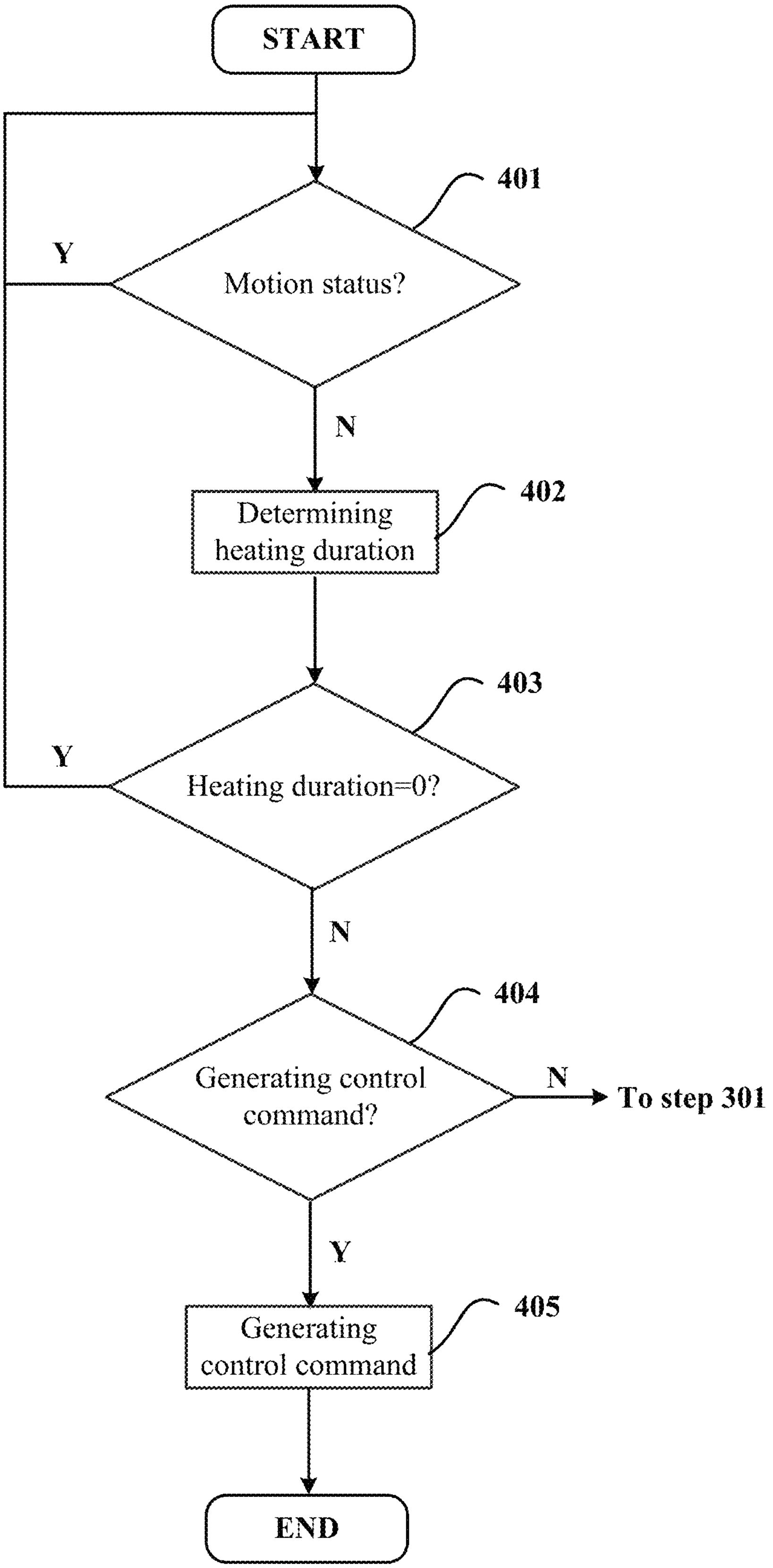
FIG. 4 is a flowchart of a heating control method for an escalator system or automatic walkway system in accordance with some other embodiments of the present application.

FIG. 4 is a flowchart of a heating control method for an escalator system or automatic walkway system in accordance with some other embodiments of the present application. Exemplarily, the method described below is implemented with the help of the controller shown in FIG. 2. That is, the computer program 240 in FIG. 2 may include computer instructions for implementing the various steps of the method described below, such that the corresponding methods can be implemented when the computer program 240 is run on the processor 230.

In the embodiment shown in FIG. 4, the heater operates at a constant power (e.g., the current flowing through the resistive wire is constant current) for simplicity of control logic. Exemplarily, the heater may operate at a plurality of constant powers, and the controller may select one of the constant powers as the operating parameter for the heater.

The method shown in FIG. 4 begins at step 401. In step 401, the controller periodically obtains status parameters associated with the heating control (e.g., parameters associated with ambient status and device status), and determines whether it is necessary to initiate the generation of a heating control command based on the current operating status of the escalator system or the automatic walkway system. If the step of the escalator system or the movable road surface of the automatic walkway system is currently in motion, the components are substantially free from the possibility of icing, considering the heating of the components of the escalator system or the automatic walkway system itself in the motion status, so the current operating status will continue to be monitored; on the other hand, if the step of the escalator system or the movable road surface of the automatic walkway system is currently in a stationary status, the method shown in FIG. 4 moves to step 402, considering the potential possibility of icing.

In this step, in addition to the periodic execution of the determination, the execution of the determination may also be triggered in other ways (such as user intervention).

In step 402, the controller will determine the heating duration of the heater based on the ambient status. In some embodiments, the heating duration may be determined in the following manner Scenario 1

If the ambient temperature $T_A$ is greater than a first threshold $TH_1$ or the ambient humidity $H_A$ is less than a second threshold $TH_2$, the heating duration Δt is set to 0. Exemplarily, the first threshold $TH_1$ may be set, for example, to 5° C. and the second threshold $T_2$ is set to 20%.

Scenario 2

If the ambient temperature $T_A$ is between the first threshold $TH_1$ and a third threshold $TH_3$ and the ambient humidity H A is between the second threshold $TH_2$ and a fourth threshold $TH_4$, the heating time Δt is set to a value that increases as the ambient temperature decreases and increases as the ambient humidity increases. Here the third threshold $TH_3$ is less than the first threshold $TH_1$ and the fourth threshold $TH_4$ is greater than the second threshold $TH_2$. Exemplarily, the second threshold $TH_2$ may be set, for example, to −10° C. and the fourth threshold $TH_4$ is set to 80%.

Optionally, the heating time increases linearly with decreasing ambient temperature and increases linearly with increasing ambient humidity. For example, the heating time Δt may be calculated according to the following equation:

$$\Delta t=k_1\times(TH_1-T_A)+k_2\times(H_A-TH_2) \tag{1}$$

In the above equation (1), k1 and k2 are constants greater than 0, which may be determined experimentally or using simulation results.

Optionally, the heating time increases non-linearly with decreasing ambient temperature and increases non-linearly with increasing ambient humidity. For example, the heating time Δt may be calculated according to the following equation:

$$\Delta t=k_3\times(1-e^{-\alpha(TH_1-T_A)})+k_4\times(1-e^{-\beta(H_A-TH_2)}) \tag{2}$$

In the above equation (2), k3, k4, α and β are constants greater than 0, which can be determined experimentally or using simulation results.

The inventors of the application found, after an in-depth study, that normally, as the heating time increases, the same heating time will lead to a greater warming and a greater reduction in humidity, i.e., the effect of heating time on preventing icing is marginal decreasing. Therefore, the heating efficiency can be improved while the energy consumption can be reduced by setting the heating time to increase non-linearly with decreasing ambient temperature and increase non-linearly with increasing ambient humidity (as shown in equation (2) above).

Scenario 3

If the ambient temperature $T_A$ is less than the third threshold value $T_3$ or the ambient humidity $H_A$ is greater than the fourth threshold value $T_4$, the heating duration Δt is set to an upper value $\Delta t_{max}$.

After performing step 402, the method shown in FIG. 4 moves to step 403. In this step, the controller determines whether the heating duration Δt determined in step 402 is 0. If it is 0, it returns to step 401, otherwise it proceeds to step 404.

In step 404, it is determined whether to generate a control command to start the heater based on the heating duration Δt determined in step 402 and the expected operating status of the escalator system or the automatic walkway system.

In some embodiments, the expected operating status may be startup status of the escalator system or the automatic walkway system, and it is determined whether to generate a control command to start the heater in the following manner:

if an interval Δt' between a current moment $t_{current}$ and a moment $t_{start}$ of entering the startup status is less than the heating duration Δt determined in step 402, it proceeds to step 405, otherwise it returns to step 401.

Exemplarily, assuming that the current moment is 9:00 a.m., the escalator system or the automatic walkway system is expected to start at 9:50 a.m., so the interval Δt' is 50 minutes. If the determined heating duration Δt is 1 hour, then since the interval Δt' is less than the heating duration Δt, at step 404 the controller will determine that a control command to start the heater needs to be generated. In another example, assuming that the current moment is 8:00 a.m., the escalator system or the automatic walkway system is expected to start at 9:50 a.m., so the interval Δt' is 1 hour and 50 minutes. If the determined heating duration Δt is still 1 hour, then since the interval Δt' is greater than the heating duration Δt, at step 404 the controller will determine that there is no need to generate a control command to start the heater, thus avoiding energy waste caused by early starting the heating process.

For existing controllers, the heating control logic described above can be implemented simply by upgrading the control software running therein, which is beneficial to reduce costs and shorten system development time.

In step 405, the controller generates a control command to start the heater and subsequently ends the method flow of FIG. 4.

According to another aspect of the present application, there is also provided a computer-readable storage medium on which a computer program is stored. When the program is executed by the processor, one or more steps contained in the methods described above with the help of FIGS. 3-4 may be realized.

The computer-readable storage medium referred in the application includes various types of computer storage medium, and may be any available medium that may be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage apparatus, or any other transitory or non-transitory medium that may be used to carry or store a desired program code unit in the form of instructions or data structures and that may be accessed by a general-purpose or special-purpose computer or a general-purpose or special-purpose processor. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and implementations shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. A heating control apparatus for an escalator system or automatic walkway system, comprising:

memory;

a processor coupled with the memory; and a computer program stored on the memory and running on the processor, the running of the computer program causes:

A. obtaining ambient status and device status of the escalator system or automatic walkway system, wherein the ambient status includes ambient temperature and ambient humidity; and B. generating a control command regarding a heater of the escalator system or automatic walkway system based on the ambient status and the device status.

2. The heating control apparatus of claim 1, wherein the heating control apparatus is a controller of the escalator system or automatic walkway system.

3. The heating control apparatus of claim 1, wherein the device status comprises current operating status and expected operating status of the escalator system or automatic walkway system.

4. The heating control apparatus of claim 3, wherein the heater operates at constant power, operation B is implemented in accordance with the following:

determining a heating duration of the heater based on the ambient status if the current operating status of the escalator system or automatic walkway system is in a state where a step of the escalator system or movable road surface of the automatic walkway system is stationary;

determining whether to generate a control command to start the heater based on the determined heating duration and the expected operating status.

5. The heating control apparatus of claim 4, wherein the expected operating status is startup status of the escalator system or the automatic walkway system, it determines whether to generate the control command to start the heater in the following manner:

generating the control command to start the heater if an interval between a current moment and a moment of entering the startup status is less than the heating duration.

6. The heating control apparatus of claim 4, wherein the heating duration is determined in the following manner:

setting the heating duration to 0 if the ambient temperature is greater than a first threshold or the ambient humidity is less than a second threshold;

setting the heating duration to a value that increases as the ambient temperature decreases and increases as the ambient humidity increases if the ambient temperature is between the first threshold and a third threshold and the ambient humidity is between the second threshold and a fourth threshold, wherein the third threshold is less than the first threshold and the fourth threshold is greater than the second threshold;

setting the heating duration to an upper value if the ambient temperature is less than the third threshold or the ambient humidity is greater than the fourth threshold.

7. The heating control apparatus of claim 6, wherein for the case where the ambient temperature is between the first threshold and the third threshold and the ambient humidity is between the second threshold and the fourth threshold, the heating duration increases linearly with decreasing ambient temperature and increases linearly with increasing ambient humidity.

8. The heating control apparatus of claim 6, wherein for the case where the ambient temperature is between the first threshold and the third threshold and the ambient humidity is between the second threshold and the fourth threshold, the heating duration increases non-linearly with decreasing ambient temperature and increases non-linearly with increasing ambient humidity.

9. An escalator system or an automatic walkway system, comprising:

a conveying mechanism;

a driving unit for driving the conveying mechanism;

a heater; and a heating control apparatus of claim 1.

10. The escalator system or an automatic walkway system of claim 9, wherein the heater is a resistive wire provided near one or more components of the escalator system or automated walkway system.

11. A heating control method for an escalator system or automatic walkway system, comprising:

A. obtaining ambient status and device status of the escalator system or automatic walkway system, wherein the ambient status includes ambient temperature and ambient humidity; and B. generating a control command for a heater of the escalator system or automatic walkway system based on the ambient status and the device status.

12. The heating control method of claim 11, wherein the device status comprises current operating status and expected operating status of the escalator system or automatic walkway system.

13. The heating control method of claim 12, wherein the heater operates at constant power, step B comprising:

determining a heating duration of the heater based on the ambient status if the current operating status of the escalator system or automatic walkway system is in a state where a step of the escalator system or movable road surface of the automatic walkway system is stationary;

determining whether to generate a control command to start the heater based on the determined heating duration and the expected operating status.

14. The heating control method of claim 13, wherein the heating duration is determined in the following manner:

setting the heating duration to 0 if the ambient temperature is greater than a first threshold or the ambient humidity is less than a second threshold;

setting the heating duration to a value that increases as the ambient temperature decreases and increases as the ambient humidity increases if the ambient temperature is between the first threshold and a third threshold and the ambient humidity is between the second threshold and a fourth threshold, wherein the third threshold is less than the first threshold and the fourth threshold is greater than the second threshold;

setting the heating duration to an upper value if the ambient temperature is less than the third threshold or the ambient humidity is greater than the fourth threshold.

15. The heating control method of claim 14, wherein for the case where the ambient temperature is between the first threshold and the third threshold and the ambient humidity is between the second threshold and the fourth threshold, the heating duration increases linearly with decreasing ambient temperature and increases linearly with increasing ambient humidity.

16. The heating control method of claim 14, wherein for the case where the ambient temperature is between the first threshold and the third threshold and the ambient humidity is between the second threshold and the fourth threshold, the heating duration increases non-linearly with decreasing ambient temperature and increases non-linearly with increasing ambient humidity.

17. The heating control method of claim 13, wherein the expected operating status is startup status of the escalator system or the automatic walkway system, it determines whether to generate the control command to start the heater in the following manner:

generating the control command to start the heater if an interval between a current moment and a moment of entering the startup status is less than the heating duration.

18. A computer-readable storage medium having instructions stored in the computer-readable storage medium, when the instructions are executed by a processor, the processor is caused to execute the method of claim 11.

* * * * *